April 13, 1926.

C. SCHLEICH 1,580,384

EMERGENCY BRAKE OPERATING MEANS

Filed Oct. 8, 1925

Witnesses
Chas. L. McDonald
E. N. Lovewell

Inventor
Clarence Schleich

By E. G. Siggers
Attorney

Patented Apr. 13, 1926.

1,580,384

UNITED STATES PATENT OFFICE.

CLARENCE SCHLEICH, OF FREEPORT, ILLINOIS.

EMERGENCY-BRAKE-OPERATING MEANS.

Application filed October 8, 1925. Serial No. 61,244.

*To all whom it may concern:*

Be it known that I, CLARENCE SCHLEICH, a citizen of the United States, residing at Freeport, in the county of Stephenson and State of Illinois, have invented a new and useful Emergency-Brake-Operating Means, of which the following is a specification.

This invention relates to an attachment for automobiles, which is adapted to take the place of the usual hand lever for controlling the operation of the emergency brake.

In many automobiles as now constructed, particularly those of the Ford type, the emergency brake is controlled by means of an upstanding hand lever, which is located at the left-hand side of the driver's feet, directly in the doorway, thus making it very inconvenient for the driver to enter or leave the car at that side.

The object of the present invention is to provide an attachment including an operating lever located to the right of the driver, so as not to interfere with people entering or leaving the car from either side, at the same time using the same pawl and ratchet which is supported on the left-hand frame bar, the pawl being released as heretofore by means of a latch rod mounted on the lever, and connected to the pawl by novel mechanism as hereinafter described.

The preferred form of the invention is illustrated in the accompanying drawings, in which—

Figure 1:
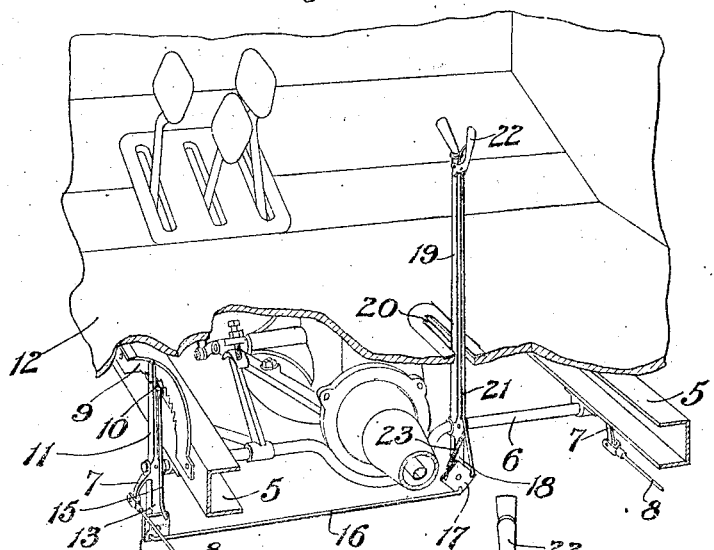
Figure 1 is a perspective view of a portion of an automobile having the invention mounted thereon.
Figure 3:
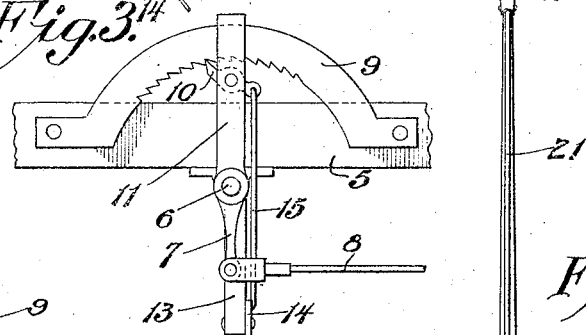
Figure 3 is a side elevation of the pawl and ratchet, and the parts associated therewith.
Figure 2:
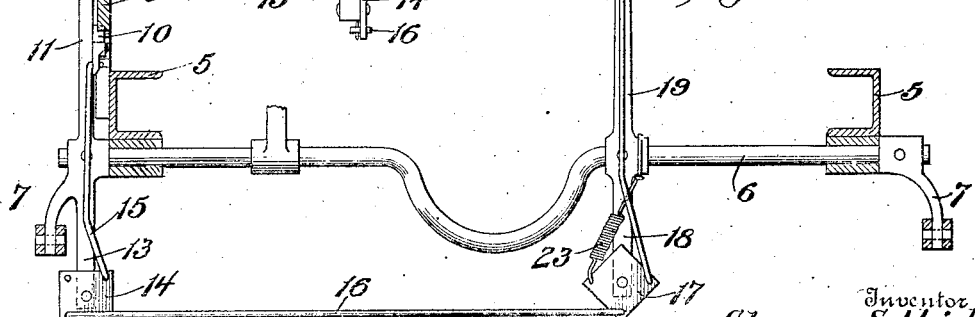
Figure 2 is a rear elevation of the invention with parts of the frame shown in section.

The invention is shown in connection with an automobile having side rails 5, which support a rock shaft 6, having arms 7 connected to rods 8 leading to the brake shoes. An arcuate ratchet member 9 is secured to the left-hand rail 5, and a pawl 10 is adapted to cooperate therewith to hold the brake shoes in active position. These parts are arranged in the usual manner.

In carrying out my invention, the pawl 10 is pivotally mounted on a lever 11, which is secured to the end of the rock shaft 6 with its upper end terminating below the floor board 12. The lever 11 may be formed integral with the arm 7 at the left-hand end of the rock shaft 6, and has a downwardly extended portion 13, at the lower end of which is pivotally mounted a crank disk or plate 14. A stiff link or rod 15 connects one side of the plate 14 to the rear end of the pawl 10, so that when the plate 14 is rocked in one direction about its pivot, the pawl engages the teeth of the ratchet member 9, and when the plate 14 is rocked in the other direction, the pawl is released.

A link 16 is connected to the plate 14 at the opposite side of its pivot, and extends inwardly beneath the chassis, where it is connected to the lower portion of a similar crank disk or plate 17, which is pivotally mounted on the downwardly projecting portion 18 of a hand lever 19, which is secured to the rock shaft 6, and extends upwardly through a slot 20 in the floor board, located to the right of the driver. A latch rod 21 is connected at its lower end to the plate 17 at one side of the center thereof, and is connected at its upper end to a thumb piece 22 mounted at the upper end of the hand lever 19.

The hand lever 19 may be operated by the right hand of the driver to set the brakes, and when the thumb piece 22 is actuated to lift the latch rod 21, thereby rocking the plates 17 and 14 to raise the link 15 and release the pawl 10, the lever 19 may be returned to release the brakes. A coil spring 23 connects the hub of the lever 19 with the plate 17, at the side opposite to the point at which the latch rod 21 is connected, so that whenever the thumb piece 22 is released, the pawl 10 is actuated to engage the teeth of the ratchet member 9, and hold the brakes in the position in which they have been set.

It will be noted that the short lever 11 is secured to the left-hand end of the rock shaft 6, in the same position in which the emergency brake lever has heretofore been secured, and the same lever may be used by cutting off its upper portion which has heretofore extended upwardly through the floor board, and by welding or otherwise securing the downward projection 13 thereto. The pawl 10 is mounted in the same manner as before, while the link 15 replaces the usual latch rod, and the hand lever 19 is placed in a position where it offers no obstruction to the driver when entering or leaving the car through the left-hand door. The attachment may be manufactured at a comparatively low cost, and may be installed with very little trouble, and the hand lever is actuated in the same manner as before, except that the driver uses his right hand instead of his left hand.

While I have shown and described in detail the preferred embodiment of the invention, it is to be understood that various modifications may be made in the form and relative arrangement of the various elements without any material departure from the salient features of the invention as expressed in the claims.

What is claimed is:

1. In a brake operating mechanism, the combination of a frame having side rails, a transverse rock shaft supported by said rails, a ratchet bar secured to one of the side rails, a lever secured to said shaft, a pawl pivotally mounted on said lever and cooperating with said ratchet member, a second lever secured to said shaft at a distance from the first-mentioned lever, and means mounted on the second lever and operatively connected with said pawl for actuating the latter.

2. In a brake operating mechanism, the combination of a frame having side rails, a rock shaft supported by said rails, a ratchet member secured to one of the rails, a lever secured to said shaft, a pawl pivotally mounted on said lever and cooperating with said ratchet member, a rod connected at one end to the pawl, a plate rockably mounted on said lever and connected at one side of its axis to the other end of said rod, a link having one end connected to the plate at the other side of its axis, a second lever secured to the rock shaft at a distance from the first-mentioned lever, a plate rockably mounted on the second lever and connected to the other end of said link, and a latch rod carried by the second lever and connected to the last-mentioned plate for rocking the latter, thereby rocking the pawl about its pivot.

3. In a brake operating mechanism, the combination of a frame, a rock shaft supported thereby, a ratchet member secured to the frame, a lever secured to said shaft, a pawl pivotally mounted on said lever and cooperating with the ratchet member, a second lever secured to said shaft at a distance from the first-mentioned lever, similar plates rockably mounted on the respective levers, a link connecting the plates to cause them to rock in unison, means mounted on the second lever for rocking said plates, and means connecting the plate on the first-mentioned lever to the pawl for rocking the latter about its pivot.

4. In a device of the character described, the combination of a rock shaft, two levers secured thereon in spaced relation to each other, a pawl pivotally mounted on one of the levers, a fixed ratchet member cooperating therewith, and means mounted on the other lever and operatively connected to said pawl for swinging the latter about its pivot.

5. In a device of the character described, the combination of a rock shaft, two levers secured thereon in spaced relation to each other, a plate rockably mounted on each lever, a link connecting the two plates to cause them to rock in unison, a pawl pivotally mounted on one lever, a rod operatively connecting the pawl to the plate on that lever, and a latch rod on the other lever connected to the other plate to rock the latter and thereby actuate the pawl.

In testimony that I claim the foregoing as my own, I have hereto affixed my signature.

CLARENCE SCHLEICH.